United States Patent
Ng et al.

(10) Patent No.: US 9,703,787 B2
(45) Date of Patent: Jul. 11, 2017

(54) DATA STORAGE MANAGEMENT APPARATUS AND DATA STORAGE MANAGEMENT METHOD

(71) Applicant: YOKOGAWA ELECTRIC CORPORATION, Musashino-shi, Tokyo (JP)

(72) Inventors: Jason Allan Lu Ng, Singapore (SG); Bijuraj Pandiyath Velayudhan, Singapore (SG); Muralee Krishnan RajendranPillai Sarojini, Singapore (SG)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 322 days.

(21) Appl. No.: 14/224,663

(22) Filed: Mar. 25, 2014

(65) Prior Publication Data
US 2015/0278233 A1    Oct. 1, 2015

(51) Int. Cl.
G06F 7/00    (2006.01)
G06F 17/00    (2006.01)
G06F 17/30    (2006.01)
H04L 12/26    (2006.01)

(52) U.S. Cl.
CPC .. *G06F 17/30085* (2013.01); *G06F 17/30067* (2013.01); *G06F 17/30286* (2013.01); *H04L 43/08* (2013.01)

(58) Field of Classification Search
CPC ......... G06F 17/30286; G06F 17/30067; G06F 17/30085; H04L 43/08
USPC .......................................................... 707/662
See application file for complete search history.

(56) References Cited

U.S. PATENT DOCUMENTS

| | | | |
|---|---|---|---|
| 6,647,415 B1 * | 11/2003 | Olarig ................... | G06F 3/0608 709/224 |
| 6,917,949 B1 * | 7/2005 | Nguyen ............ | G06F 17/30899 |
| 7,363,454 B2 | 4/2008 | Cannon et al. | |
| 7,818,300 B1 * | 10/2010 | Kilday ................... | G06Q 10/10 707/662 |
| 8,307,176 B1 | 11/2012 | Wu et al. | |
| 2002/0171678 A1 * | 11/2002 | Bandhole ................ | H04L 67/12 715/744 |
| 2007/0294308 A1 * | 12/2007 | Megerian .......... | G06F 17/30289 |
| 2008/0034003 A1 * | 2/2008 | Stakutis ............ | G06F 17/30085 |
| 2009/0125572 A1 * | 5/2009 | Cannon ............. | G06F 17/30188 |

(Continued)

*Primary Examiner* — Kris Mackes
*Assistant Examiner* — Lin Lin Htay
(74) *Attorney, Agent, or Firm* — Westerman, Hattori, Daniels & Adrian, LLP (57) ABSTRACT

A data storage management apparatus in an industrial plant is configured to communicate with a first data storage location which is configured to be a primary data storage location. The apparatus is further configured to communicate with a storage parameter configuration database, and a storage data configuration database. The apparatus is configured to determine if a utilization parameter in the primary data storage location is the same as or greater than a utilization limit. When the utilization parameter is determined to be the same as or greater than the utilization limit, the apparatus is configured to identify from the primary data storage location stored data having a storage duration which is the same as or greater than a retrieved data retention policy. The identified stored data is deleted.

11 Claims, 8 Drawing Sheets

(56) References Cited

U.S. PATENT DOCUMENTS

2013/0024423 A1\* 1/2013 Doshi ................ G06F 11/1448
707/640

\* cited by examiner

DATA STORAGE MANAGEMENT APPARATUS AND DATA STORAGE MANAGEMENT METHOD

FIELD OF THE INVENTION

The present invention relates to a data storage management apparatus and a method of managing data storage in an industrial plant.

BACKGROUND OF THE INVENTION

In prior art, storage management technologies are often used in applications that require writing/reading data to multiple storage media. Storage management is usually done by having a list of registered drives or folders and selecting the appropriate drive to store to.

There are multiple techniques which are used to select the storage location to store data.

U.S. Pat. No. 8,307,176 discloses one technique to register multiple storage locations with a fixed size in a list. Once a storage location is filled up, a next storage location in the list is used. If all storage locations are filled up, all data in the first location in the list is overwritten. For example, in a case where there are three storage locations, Storage A, Storage B and Storage C. When Storage A is filled up, Storage B is used, followed by Storage C. When Storage C is filled up, all data in Storage A is deleted. This may cause some data in Storage A that have not expired to be deleted unnecessarily.

Another technique is to maximize the use of a storage location by performing techniques such as removal of duplicate data and providing a retention policy. The retention policy dictates a time limit a certain file or data in the storage location is retained before it is moved to another media or deleted. In this case, if one or part of the data in the storage location fulfills or exceeds the time limit, the entire storage location is deleted. Data that have not exceeded the time limit are deleted unnecessarily.

In Osisoft PI Server System Management Guide Chapter 3, yet another technique is to apply different data management policies such as a "least recently used" policy. This means that current data is written to a least recently used drive to ensure that all drives are consumed at a fixed rate. Similar to previous prior art described, data in the least recently used drive are deleted before the current data is written. Hence, there may be data that are deleted unnecessarily.

With reference to FIG. 5 of U.S. Pat. No. 7,363,454, a basic flow of a data storage system is illustrated. An application requests free data storage space to store data. The invention of U.S. Pat. No. 7,363,454 then looks at the list of storage locations registered in a storage pool, performs algorithm to select the most appropriate storage location and returns a storage location (e.g. drive volume, folder on the drive volume, etc.) to the requesting application. There appears to be no disclosure on how to handle the scenario when all storage locations are filled.

In a typical industrial plant, large amount of data are stored for many years. In remote industrial environments such as ships or offshore exploration platforms, it is not possible to monitor disk usage daily. Typically, data collection is done in large volume and at higher frequencies, for example, data collection from 2,000,000 field devices in one second intervals. At this rate, 2 million TB of disk space is required each year. The data collected includes process data, alarms and events.

In industrial plants, it is undesirable to use a single hard disk drive to meet system storage requirements and there is a constraint on number of storage media which can be installed due to physical space limitations. A disk full scenario occurs when a disk has reached its storage limit. Currently, when there is a disk full scenario in an industrial plant and there is no available space for new data, the new data is not saved and discarded. This may result in loss of important data. Therefore, disk full scenarios should be avoided as much as possible and solutions are needed to improve the efficiency of handling large data volume.

SUMMARY OF THE INVENTION

A data storage management apparatus, in an industrial plant, configured to communicate with at least a first data storage location, the first data storage location is configured to be a primary data storage location having stored data. The data storage management apparatus includes a monitoring tool and a writing tool. The monitoring tool is configured to communicate with the primary data storage location and a storage parameter configuration database. The writing tool is configured to communicate with the primary data storage location, the monitoring tool, and a storage data configuration database. The monitoring tool is configured to retrieve, from the storage parameter configuration database, a utilization limit; determine, from the primary data storage location, if a utilization parameter is the same as or greater than the retrieved utilization limit. When the primary data storage location utilization parameter is determined to be the same as or greater than the retrieved utilization limit, the monitoring tool sends a notification to the writing tool. The writing tool is configured to retrieve, from the storage data configuration database, a data retention policy; identify, from the primary data storage location, at least one stored data having a storage duration the same as or greater than the retrieved data retention policy; and delete the identified at least one stored data having the storage duration the same as or greater than the retrieved data retention policy.

In some embodiments, the apparatus is further configured to communicate with at least a second data storage location having stored data. When the primary data storage location utilization parameter is determined to be the same as or greater than the retrieved utilization limit, the monitoring tool is configured to determine, from the second data storage location, if a utilization parameter is the same as or greater than the retrieved utilization limit. When the second data storage location utilization parameter is determined to be the same as or greater than the retrieved utilization limit, the monitoring tool sends a notification to the writing tool. The writing tool is configured to identify, from at least one of the first data storage location and the second data storage location, at least one stored data having a storage duration the same as or greater than the retrieved data retention policy; and delete the identified at least one stored data having a storage duration the same as or greater than the retrieved data retention policy.

In some embodiments, when the monitoring tool determines at least one of the first data storage location utilization parameter and second data storage location utilization parameter is less than the retrieved utilization limit, the monitoring tool is configured to update either the first data storage location or the second data storage location as the primary location; and notify the writing tool of the updated primary location.

In some embodiments, when the stored data comprises a plurality data types, the apparatus further comprises a plurality of writing tools, one writing tool for each data type.

In some embodiments, when there is a plurality of writing tools, the monitoring tool sends notifications to the plurality of writing tools at the same time.

In some embodiments, the predefined data retention policy comprises a first period.

In some embodiments, the predefined data retention policy comprises a second period, different from the first period.

In some embodiments, the second data storage location utilization limit is different from the first storage location utilization limit.

In some embodiments, the monitoring tool comprises a storage location monitoring unit, the storage location monitoring unit is configured to retrieve, from the primary data storage location, the utilization parameter; retrieve, from the storage parameter configuration database, the utilization limit; determine if the retrieved primary data storage location utilization parameter is the same as or greater than the retrieved predefined utilization limit; and send a notification to the writing tool.

In some embodiments, the monitoring unit comprises a configuration unit configured to communicate with the storage location monitoring unit and a user interface. The configuration unit receives an input of the utilization limit to be supplied on the user interface.

In some embodiments, the apparatus is further configured to communicate with a second data storage location. The configuration unit is configured to communicate with a user interface to receive an input of at least one of: a second data storage location to be added to the communication with the storage location monitoring unit; the first data storage location to be removed from the communication with the storage location monitoring unit; a first data storage location utilization limit, and a second data storage location utilization limit, to be supplied on the user interface.

In some embodiments, the writing tool comprises a writing tool administration unit configured to receive a notification from the monitoring tool; identify, from the primary data storage location, at least one stored data having a storage duration the same as or greater than the retrieved data retention policy; delete the identified at least one stored data having the storage duration; and stores data to the primary data storage location.

In some embodiments, the writing tool comprises a writing tool configuration unit configured to configured to receive at least one of: a first period and a second period, different from the first period, in the retrieved data retention policy to be supplied on a user interface.

In some embodiment, the invention is a data storage management method performed in a data storage management apparatus in an industrial plant. The apparatus is configured to communicate with at least a first data storage location, the first data storage location is configured to be a primary location. The method retrieves, from a storage parameter configuration database, a utilization limit; determines, from the primary data storage location, if a utilization parameter is the same as or greater than the retrieved utilization limit. When the primary data storage location utilization parameter is determined to be the same as or greater than the retrieved predefined utilization limit, the method retrieves, from the storage data configuration database, a data retention policy; identifies, from the primary data storage location, at least one stored data having a storage duration the same as or greater than the retrieved data retention policy; and deletes the identified at least one stored data having the storage duration the same as or greater than the retrieved data retention policy.

In some embodiments, when the primary data storage location utilization parameter is determined to be the same as or greater than the retrieved utilization limit, the method determines, from the second data storage location, if a utilization parameter is the same as or greater than the retrieved utilization limit. When the second data storage location utilization parameter is determined to be the same as or greater than the retrieved utilization limit, the method identifies, from at least one of the first data storage location and the second data storage location, at least one stored data having a storage duration the same as or greater than the retrieved data retention policy; and deletes the identified at least one stored data having the storage duration the same as or greater than the retrieved data retention policy.

In some embodiments, when at least one of the first data storage location utilization parameter and second data storage location utilization parameter is determined to be the less than the retrieved utilization limit, the method updates either the first data storage location or the second data storage location as the primary location.

In some embodiments, when the data retention policy comprises at least one of a first period and a second period, the second period is different from the first period, the method receives an input of one of: the utilization limit, the first period in the data retention policy, and the second period in the data retention policy, to be supplied on a user interface; and stores the received at least one of: the first period in the data retention policy and the second period in the data retention policy to the storage data configuration database.

In some embodiments, when the data retention policy comprises at least one of a first period and second period, the second period is different from the first period, the method retrieves, from the primary data storage location, a storage duration; retrieves, from the data retention policy in the storage data configuration database, the first period; determines if the storage duration is the same as or greater than the retrieved first period. When the storage duration is less than the retrieved first period, the method retrieves, from the data retention policy in the storage data configuration database, the second period; and determines if the storage duration is the same as or greater than the retrieved second period.

In some embodiments, the method receives an input of one of: a second data storage location to be configured to be added to the communication with the storage location monitoring unit, and the first data storage location to be removed from the communication with the storage location monitoring unit, to be supplied on a user interface.

Another embodiment of the invention is a non-transitory computer readable medium that stores a computer program to be executed by a data storage management apparatus to perform a data storage management method in an industrial plant. The apparatus is configured to communicate with at least a first data storage location configured to be a primary location. The method retrieves, from a storage parameter configuration database, a utilization limit; determines, from the primary data storage location, if a utilization parameter is the same as or greater than the retrieved utilization limit. When the primary data storage location utilization parameter is determined to be the same as or greater than the retrieved predefined utilization limit, the method retrieves, from the storage data configuration database, a data retention policy; identifies, from the primary data storage location, at least one stored data having a storage duration the same as or greater than the retrieved data retention policy; and deletes the identified at least one stored data having the storage duration the same as or greater than the retrieved data retention policy.

In some embodiments of the non-transitory computer readable medium, the method further determines, from the second data storage location, if a utilization parameter is the same as or greater than the retrieved utilization limit. When the second data storage location utilization parameter is determined to be the same as or greater than the retrieved utilization limit, identifies, from at least one of the first data storage location and the second data storage location, at least one stored data having a storage duration the same as or greater than the retrieved data retention policy; and deletes the identified at least one stored data having a storage duration the same as or greater than the retrieved data retention policy.

BRIEF DESCRIPTION OF THE DRAWINGS

Embodiments of the invention will be better understood and readily apparent to one skilled in the art from the following written description, by way of example only and in conjunction with the drawings, in which.

DESCRIPTION

Figure 1A:
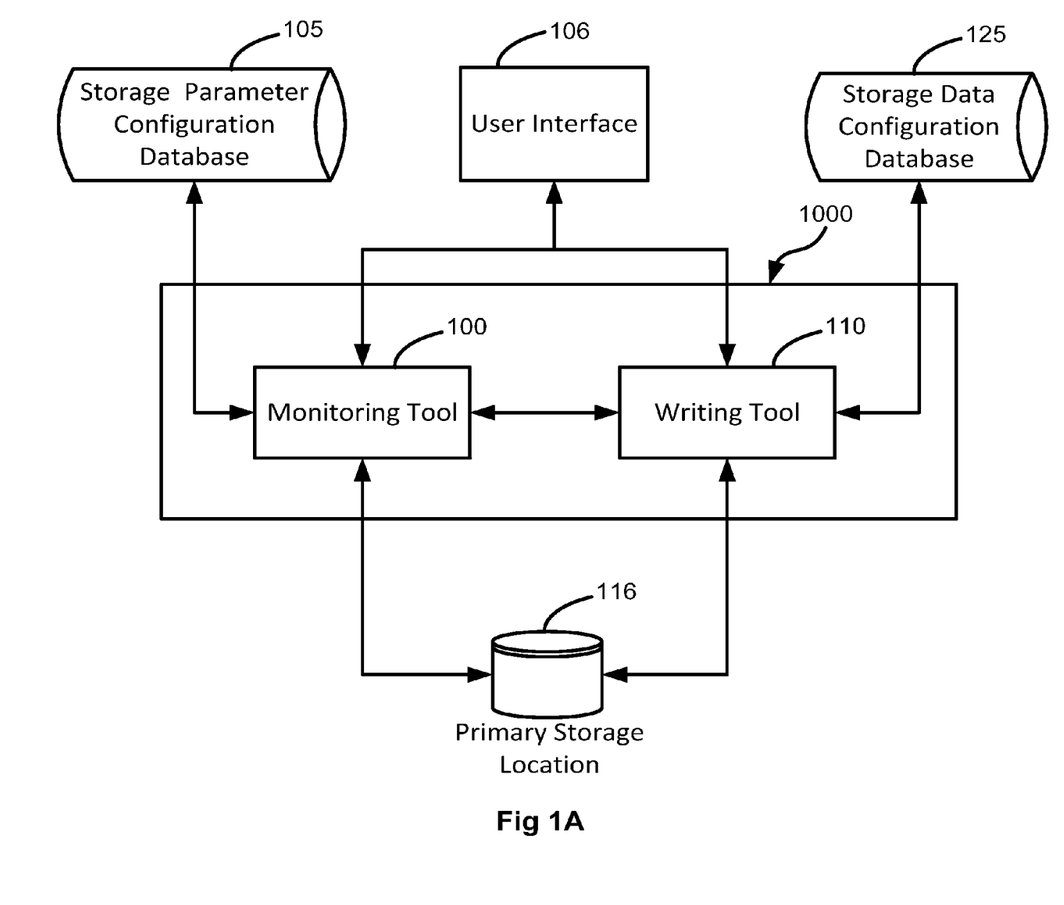
FIG. 1A is a block diagram of a data storage monitoring apparatus according to some embodiments of the present invention.

FIG. 1 is a block diagram of a data storage management apparatus 1000 for an industrial plant in some embodiments of the present invention. The industrial plant covers plants or factories of large scale that require handling of a high volume of data. The high volume of data may be due to a large number of machinery, equipment, and any other electronic apparatuses.

The industrial plant may have one or more data storage locations to be monitored and managed, wherein each data storage location may be an individual data storage device such as a hard disk drive, a Random access memory, a Flash memory and the like. It is appreciated that each data storage location includes one which is virtually created and, for instance, a partition of a hard disk drive. For instance, the data stored in these one or more data storage locations can be anything related to an industrial plant automation process or equipment and the like. Typical examples of data are messages, time series and annotation.

The data storage management apparatus 1000 includes a monitoring tool 100 and writing tool 110. The monitoring tool 100 and writing tool 110 are configured to communicate with at least one data storage location 116a. In some embodiments of the invention, multiple data storage locations 116b, 116c are configured to communicate with the monitoring tool 100 and writing tool 110. When the monitoring tool 100 configures the data storage location 116a as a primary data storage location 116, the monitoring tool 100 sends a notification to the writing tool 110 to update the data storage location 116a as the primary data storage location 116.

The monitoring tool 100 is configured to communicate with a storage parameter configuration database 105. The storage parameter configuration database 105 stores the data storage locations 116a, 116b, 116c which are configured to communicate with the apparatus 1000. In the storage parameter configuration database 105, there are multiple parameters for each data storage location 116a, 116b, 116c. The parameters include data storage location identifier, data storage location status, data storage location data utilization limit 130 (not shown), and other relevant parameters. The storage parameter configuration database 105 may be one or more data files suitable for storing data of parameters. In some embodiments of the invention, the storage parameter configuration database 105 is part of the monitoring tool 100; reside remotely from the monitoring tool 100 and is accessible by the monitoring tool 100; or reside in the same location (e.g. in the same computer) as the monitoring tool 100 and is accessible by the monitoring tool 100.

The utilization limit 130 (not shown) for each data storage location 116a, 116b, 116c is the same in some embodiments and different for some embodiments. The utilization limit 130 defines the storage limit, the maximum space, for each data storage location 116a, 116b, 116c. The data utilization limit 130 is a data storage location parameter in the storage parameter configuration database 105 indicating the maximum space that the specific data storage location, in this case, the primary data storage location 116, can be occupied before a disk full scenario occurs. A disk full scenario occurs when a message or alarm indicating the same is being sent as an output on a user interface 106.

When the storage parameter configuration database 105 stores a range of utilization limits 130, such as a lower limit 132 and an upper limit 134, the monitoring tool is configured to send an alert to the user interface 106 when at least one of the lower limit 132 and the upper limit 134 is reached.

The utilization limit 130 and its lower limits 132, upper limits 134 are configurable from a user interface or imported in a file.

The writing tool 110 is configured to communicate with a storage data configuration database 125. In some embodiments, the storage data configuration database 125 consists of one or more data files for storing the data storage locations 116a, 116b, 116c which are configured to communicate with the apparatus 1000. In the storage data configuration database 125, there are multiple parameters for each data storage location 116a, 116b, 116c, one parameter is a data retention policy 140 (not shown). The data retention policy 140 for each data storage location 116a, 116b, 116c is the same in some embodiments and different in some embodiments. The data retention policy 140 defines a period 142 (not shown) for retaining the data. In some embodiments, a second period 144 (not shown) is defined for retaining the data.

In some embodiments, the storage data configuration database 125 may be part of the Writing Tool 110, reside remotely from the Writing Tool 110 and is accessible by the Writing Tool 110, or reside in the same location (e.g. in the same computer) as the Writing Tool 110 and is accessible by the Writing Tool 110.

Figure 2A:
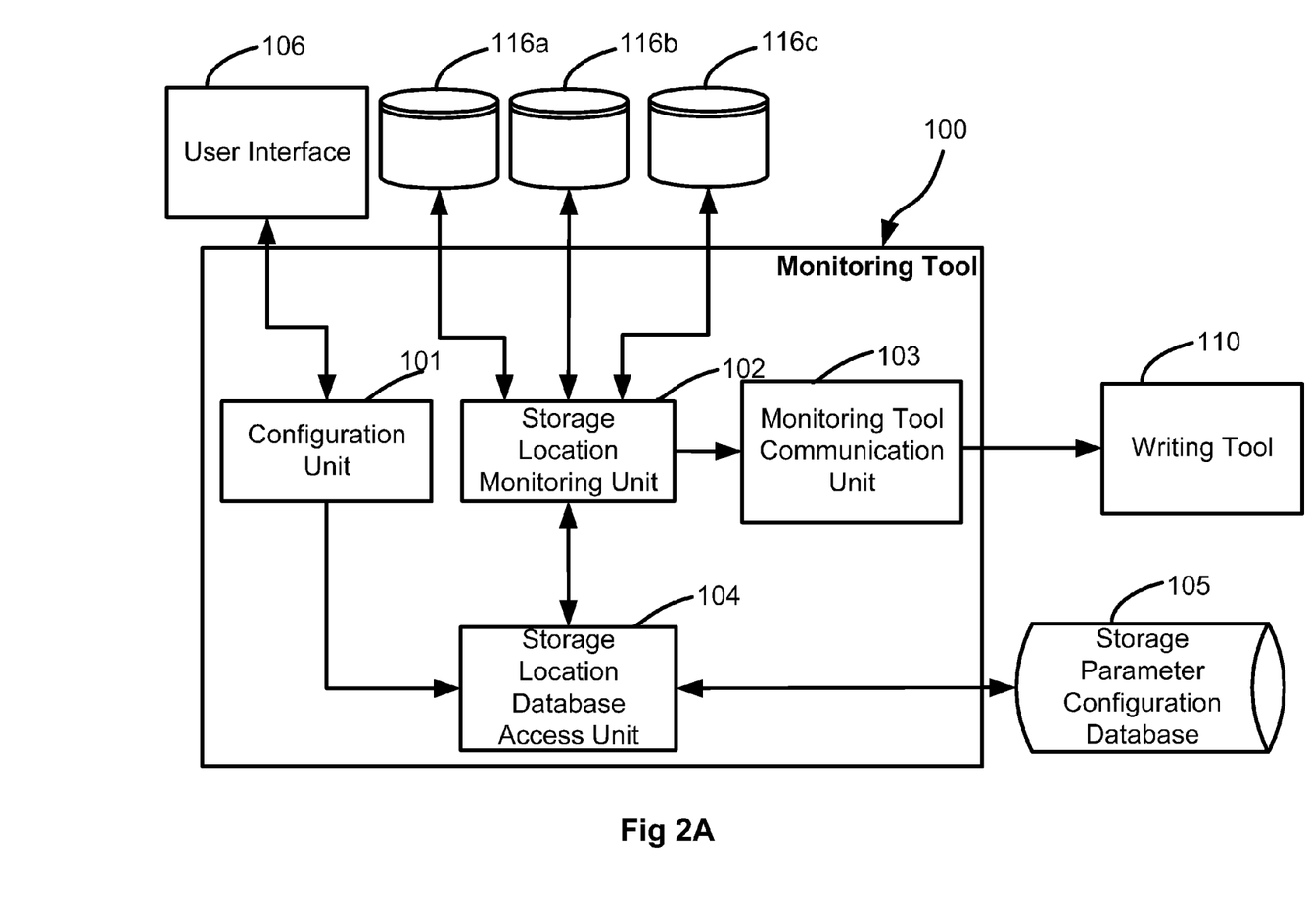
FIG. 2A is a block diagram of a monitoring tool according to some embodiments of the present invention.

FIG. 2A is a block diagram of a monitoring tool 100 for performing data storage management in some embodiments.

The monitoring tool 100 operates in an industrial plant data management system. It may be software operable through an operating system of a computer system or an electronic apparatus, and the data required for execution of the application may be stored in a machine readable medium, or in any memory, such as Read Only Memory, Random Access Memory, Flash based Memory and the like. More specifically, the monitoring tool 100 is executed by a processing unit of the computer system or electronic apparatus.

In some embodiments, the monitoring tool 100 includes a configuration unit 101, which is configured to communicate with a user interface of the computer system or electronic apparatus. In the embodiments, when the utilization limit 130 of each data storage location 116a, 116b, 116c is configurable, a user defines the utilization limit 130 as an input of the user interface. Alternatively, the configuration unit 101 reads a utilization limit file, which defines the utilization limit for each data storage location 116a, 116b, 116c. The data storage location file is in a suitable format for exporting and importing such as XML, MS Excel, CSV. The utilization limit 130 is updated in a storage parameter configuration database 105.

In some embodiments, the user input includes a parameter being used to indicate which data storage location is to be registered and/or removed. Alternatively, the configuration unit 101 reads a data storage location file, which lists the data storage locations that are to be registered and/or removed. The data storage location file is in a suitable format for exporting and importing such as XML, MS Excel, CSV. The data storage location registration or removal is updated in a storage parameter configuration database 105. The configuration unit 101 checks whether the indicated data storage location to be registered is valid, that is whether they are accessible, in operation, or present. A registered data storage location is a data storage location that is made available for data storage. These features allow a user to add, remove, or configure storage locations conveniently.

In some embodiments, the monitoring tool 100 includes a storage location monitoring unit 102 that communicates with all components in the monitoring tool 100. Further, it is configured to communicate with other components external to the monitoring tool 100 and configured to communicate with the monitoring tool 100. In a typical example, the storage location monitoring unit 102 communicates with a primary data storage location 116 (refers to 116a, 116b or 116c in FIG. 2A). In some embodiments, the storage location monitoring unit 102 retrieves the utilization parameter 136 from the storage location 116a, 116b, 116c periodically or on request to identify an available data storage location.

The storage location monitoring unit 102 determines if the retrieved data storage location utilization parameter 136 is less than the utilization limit 130. When the retrieved data storage location utilization parameter 136 is less than the utilization limit 130, the storage location monitoring unit 102 identifies the data storage location as the available data storage location.

In some embodiments, the monitoring tool 100 includes a monitoring tool communication unit 103 to communicate with the storage location monitoring unit 102 and the writing tool 110. The monitoring tool communication unit 103 is configured to send notification to and receive notification from the writing tool 110. Further, the monitoring tool communication unit 103 is configured to translate the notifications sent and received between monitoring tool and writing tool.

In some embodiments, the monitoring tool 100 includes a storage location database access unit 104 stores a list of commands or methods. The list of commands or methods is suitable for reading parameters in or writing parameters to the storage parameter configuration database 105.

The storage location database access unit 104 is configured to translate instructions and messages sent and received between the storage parameter configuration database 105 and the storage location monitoring unit 102.

In an example, the storage location monitoring unit 102 constantly monitors the utilization parameter 136 of the primary data storage location 116. The storage location monitoring unit 102 retrieves the utilization limit 130 from the primary storage parameter configuration database 105 by identifying and sending a suitable command from the storage location database access unit 104. The storage location monitoring unit 102 determines if the utilization parameter 136 is the same as or greater than the utilization limit 130 of the primary data storage location 116.

When the utilization parameter 136 is the same as or greater than the utilization limit 130, the primary data storage location 116 has reached or is close to the utilization limit 130. The storage location monitoring unit 102 then generates a data management policy to be sent to the writing tool 110. In some embodiments, a notification is sent to the writing tool 110. The generated data management policy or notification includes one or more of the following:

data indicating that one of the data storage location 116b, 116c is configured as a new primary data storage location 116; and data containing an instruction to inform the Writing Tool 110 to execute a data management policy to delete stored data.

Furthermore, when the data storage location 116b is configured as the new primary data storage location 116, the storage location monitoring unit 102 informs the storage location database access unit 104 to set parameters relating to the data storage location 116b in the storage parameter configuration database 105 as parameters of the primary data storage location 116.

The primary data storage location 116 is generally a data storage location 116a, 116b, 116c which has been configured with a primary data storage location status. In the present example, the primary data storage location status is another data storage location parameter in the storage parameter configuration database 105. The primary data storage location 116 is the data storage location 116a, 116b, 116c, which the writing tool 110 is configured to be in communication with. The writing tool 110 stores data to the primary data storage location 116 or deletes data in the primary data storage location 116 according to the generated data management policy. The storage location database access unit 104 sets the new primary data storage location status using a command from its list of commands.

Similarly, the writing tool 110 also operates in an industrial plant data management system and may be software operable through an operating system of a computer system or an electronic apparatus, and the data required for execution of the writing tool 110 may be stored in a machine readable medium, or in any memory, such as Read Only Memory, Random Access Memory, Flash based Memory and the like. More specifically, the writing tool 110 is executed by a processing unit of the computer system or electronic apparatus. In some embodiments, the computer system or electronic apparatus is the same or different computer system or electronic apparatus for the monitoring tool 100 in FIG. 2A.

Figure 2B:
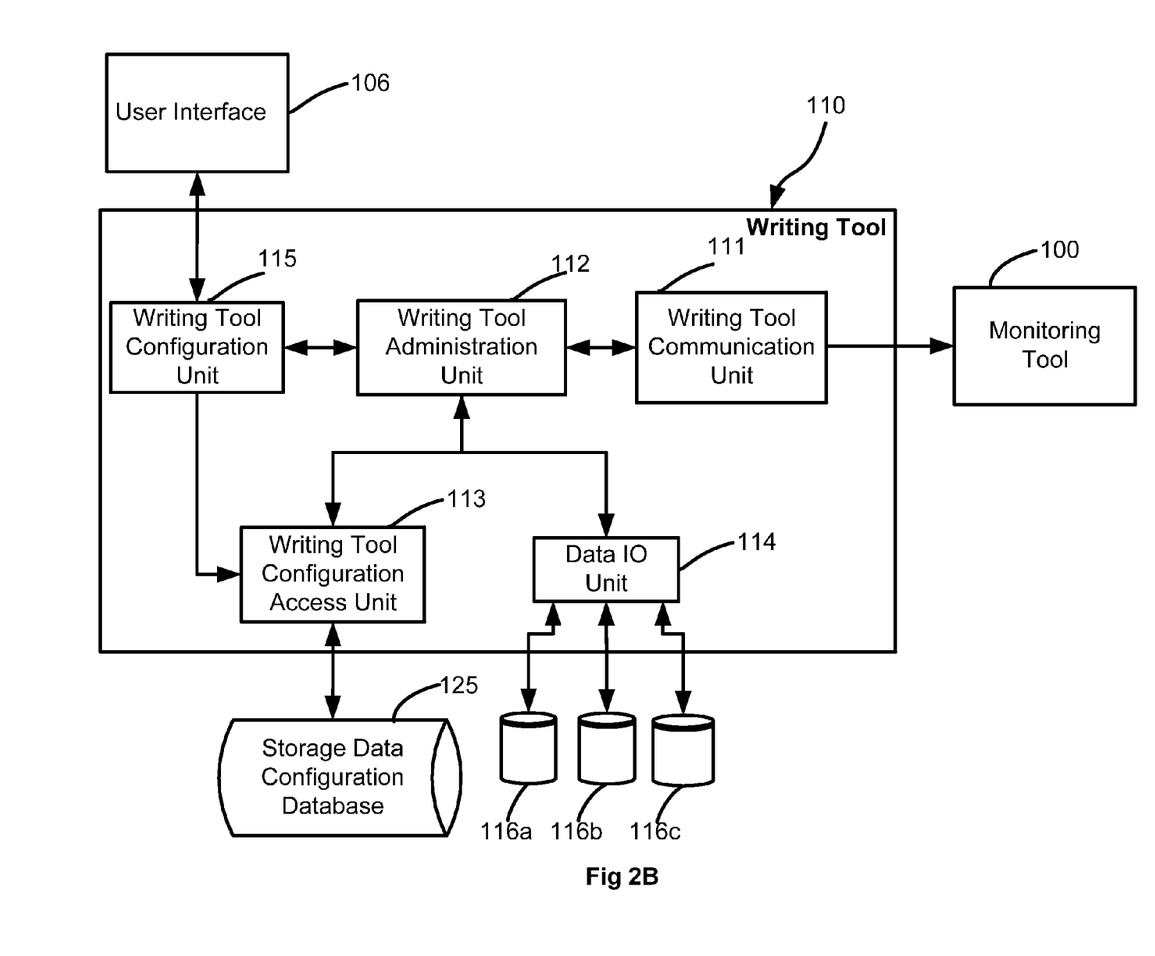
FIG. 2B is a block diagram of a writing tool according to some embodiments of the present invention.

In some embodiments, FIG. 2B is a writing tool 110 which includes a writing tool communication unit 111 for transferring information between the monitoring tool 100 and the one or more units—writing tool administration unit 112, writing tool configuration access unit 113, data input-output ("IO") unit 114, and writing tool configuration unit 115—of the writing tool 110. This information includes include one or more of the following:

- data indicating the new primary data storage location 116;
- data containing an instruction from the Monitoring Tool 100 to execute a data management policy to delete stored data at one or more data storage locations 116a, 116b, 116c; and
- data informing the monitoring tool 100 that a disk full scenario has occurred at the primary data storage location 116.

In some embodiments, the writing tool administration unit 112 that obtains information relating to the primary data storage location 116 and configured data groups, and processes instructions received from the writing tool communication unit 111 for coordination with other units in the writing tool 110 and a data storage location 116a, 116b, 116c external to the writing tool 110.

When the writing tool administration unit 112 receives a notification from the monitoring tool to implement a data retention policy 142, the writing tool administration unit 112 sends instructions to the other units in the writing tool 110 to identify stored data having a storage duration the same as or greater than the data retention policy. The identified stored data is deleted. The storage duration is calculated from a storage start date of the stored data to the current date.

The writing tool administration unit 112 performs an IO action through the data IO unit 114. Typical examples of IO actions are storing data to the primary data storage location 116 and deleting data from any of the data storage locations 116a, 116b, 116c.

A configured data group refers to data grouped by one manner of grouping in the primary data storage location 116, which is configured or created by a user. For example, the user may set certain data in the primary data storage location 116 to be grouped by geographical area, data location, machine type or any other manner according to the preference of the user. Furthermore, each data group may be further configured to include subgroups. This is useful for a user to locate data.

In some embodiments, a configured data group is data grouped by data types, such as messages, time series, annotations and any other data type. When each data type has a different format, one writing tool 110 is used for a data type. This is beneficial for data handling as large amount of data is processed by the writing tool 110 for each data type in an industrial plant. In addition, the data IO unit 114 is configured uniquely for each data type.

Figure 1B:
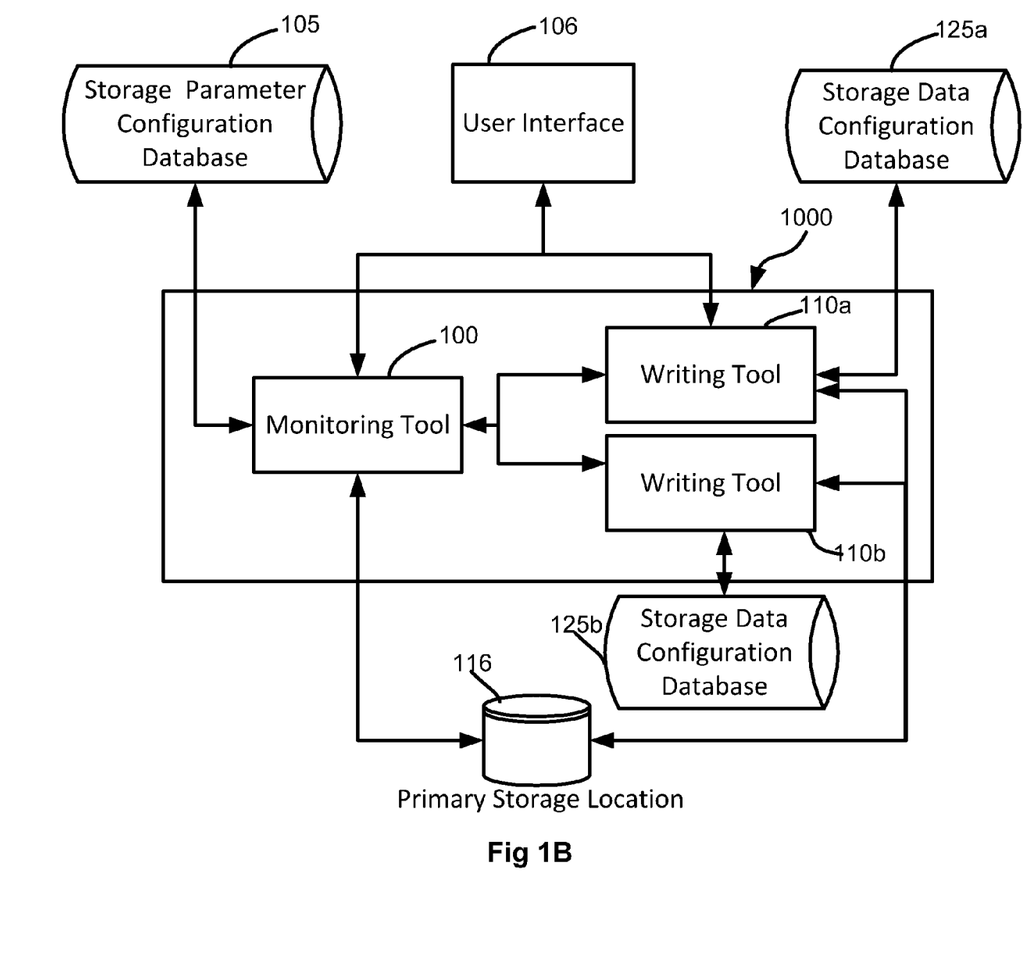
FIG. 1B is a block diagram of a data storage monitoring apparatus according to some embodiments of the present invention.

In a typical industrial plant, there are multiple writing tools 110 configured to communicate with the monitoring tool 100 and the primary data storage location 116 simultaneously as illustrated in FIG. 1B.

The configured data group is provided in a data group configuration file which is imported by the writing tool configuration unit 115. The data group configuration file is in a suitable format for exporting and importing such as XML, MS Excel, CSV and the like.

The writing tool configuration unit 115 is configured to communicate with the user interface 106 to receive a user input for data group configuration from the user. The writing tool configuration unit 115 is configured to check whether one or more of the data groups to be registered are valid, that is whether they are accessible, in operation, or present. In a typical example, information of configured data groups is kept in the storage data configuration database 125.

The writing tool configuration access unit 113 stores a list of commands or methods. The list of commands or methods is used to read in values or stores values to the primary data storage location 116 parameters. The writing tool configuration access unit 113 receives a configured data group and uses a command to update the configured data group in the storage data configuration database 125. The writing tool configuration access unit 113 is configured to store the retention policy 140, first period 142 and second period 144 in the storage data configuration database 125.

When the writing tool administration unit 112 implements the data retention policy 140, the writing tool configuration access unit 113 retrieves, from the storage data configuration database 125, the stored at least one of: the first period 142 and the second period 144 in the data retention policy 140, for updating the writing tool administration unit 112.

The data IO unit 114 reads and stores data to the primary data storage location 116. The data IO unit 114 is also responsible for carrying out the IO functions required when a generated data management policy is invoked. In a typical example, an IO function is to store data in the primary data storage location 116. In another example, an 10 function is to communicate alert to the user interface 106 for a user to perform certain tasks according to the generated data management policy.

In some embodiments, a data management policy includes a data retention policy 140. The data retention policy 140 has one or more periods. In a typical example, a first period is data retention period 144 and a second period is data erase period 146, different from the data retention period 144. The writing tool administration unit 112 uses the data retention period 144 to delete stored data. The writing tool administration unit 112 uses the data erase period 146 to delete the stored data, when there is no available storage location 116a, 116b, 116c after deleting the stored data by using the data retention period 144.

For example, the data IO unit 114 stores data to the primary data storage location 116 continuously. The data IO unit 114 stops writing data when one scenario occurs. That is, when a plant computer system or plant electronic apparatus, or the monitoring tool 100 with access to data utilization information of the primary data storage location 116 sends a notification, which indicates that the primary data storage location utilization parameter 136 is nearing or reached the utilization limit 130, to the data IO unit 114. The data IO unit 114 applies the generated data management policy to delete the stored data.

The storage data configuration database 125 contains data of items that are grouped and/or organized in folders. Using an example of the embodiment when a configured data group is data grouped by data types, Table 1 below illustrates data parameters stored in the storage data configuration database 125. The configured data groups GR1, GR2 and GR3 are configured with respective data retention periods 142 and data erase periods 144. Each of these configured data groups GR1, GR2, and GR3 has its own data retention period 142 and data erase period 144.

TABLE 1

| Data Group Name | Data Retention Period (Days) | Data Erase Period (Days) |
| --- | --- | --- |
| GR1 | 100 | 90 |
| GR2 | 20 | 10 |
| GR3 | 40 | 30 |

In the present example, the data retention period specifies the length of time, in days, the data of each configured data group is kept. This information is used in a data management policy for deletion of expired data, herein known as "delete expired data retention policy". Once a "delete expired data" instruction is received by the writing tool configuration access unit 113, the writing tool configuration access unit 113 identifies data in data groups stored for a period the same as or longer than the specified data retention period has expired. The identified data is deleted from the storage location 116a, 116b, 116c.

The data erase period specifies the "longest time" data in a data group that can be deleted. In the present example, data group GR1 has a data erase period of 90 days. This means that if the data in the data group has been stored for 90 days or more, it is regarded as old data and can be deleted. Deletion of old data takes place when a "delete old data" instruction is received by the writing tool configuration access unit 113. The writing tool configuration access unit 113 identifies data groups stored for a period the same as or longer than the data erase period has lapsed. The identified data is deleted from the data storage location 116a, 116b, 116c.

Although each data group described with reference to Table 1 has only one data retention period and only one data erase period, it is appreciated that in other examples of the computer system and electronic apparatus described herein, different data within a specific data group or data storage location can have different data retention periods or data erase periods. These different data retention periods or data erase periods are also regarded as corresponding to the specific data group or data storage location.

An advantage of the present invention is that duplicates time-stamped data of different data types, are not deleted at the same time. Only the data which is old or expired is deleted.

It is appreciated that all the application units described herein may be software components such as different classes or objects in object oriented programming, application programming interface (API), modules programmed to operate as described and the like.

Figure 3A:
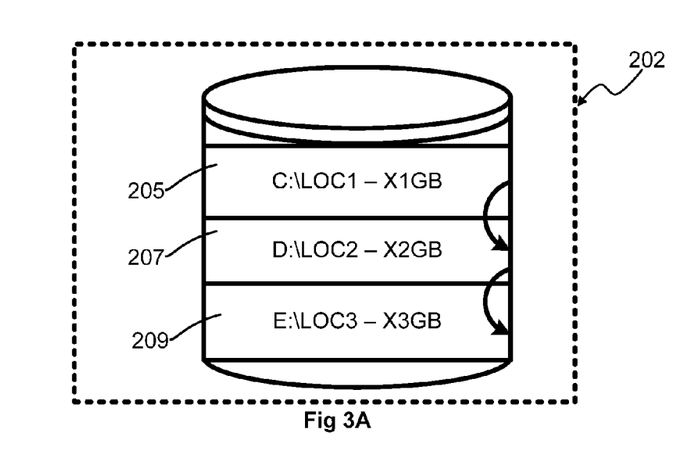
FIG. 3A is a sample configuration for a single hard disk with multiple storage locations.
Figure 3B:
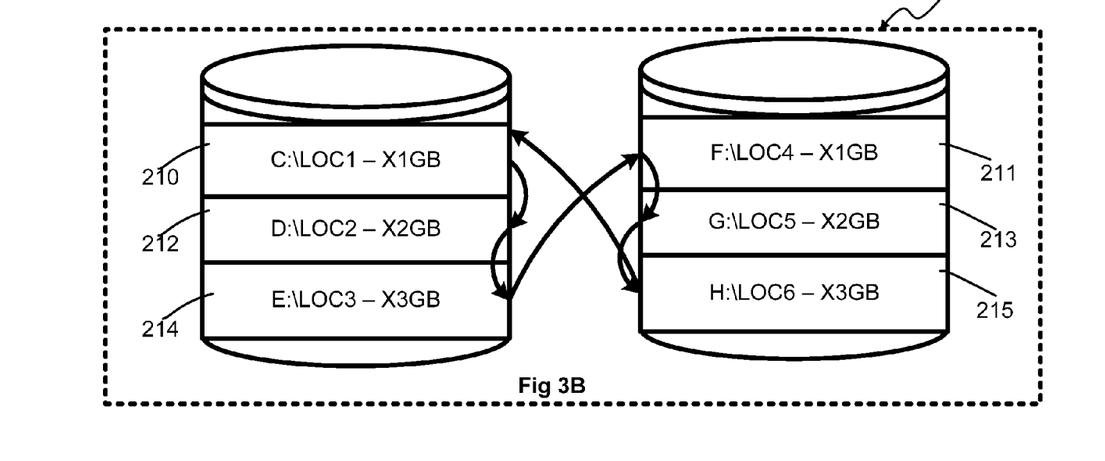
FIG. 3B is a sample configuration for a plurality of hard disks with multiple storage locations.

FIG. 3A is a sample scenario A and FIG. 3B is a sample scenario B comprising storage locations that are working in conjunction with the monitoring tool 100, writing tool 110, or any other tools which are configured to communicate with the monitoring tool 100 or writing tool 110. A data storage management method performed by the data storage management apparatus 1000 for the various data storage locations 116a, 116b, 116c will be described.

In scenario A, there is a hard disk 202 with three partitions corresponding to three registered data storage locations 205, 207 and 209 in a single storage medium. Each partition 205, 207 and 209 represents one registered data storage location 116a, 116b. 116c. In some embodiments, each data storage location 205, 207 and 209 has a different data storage size.

In scenario A, the monitoring tool 100 manages data storage in the order beginning from the first data storage location 205 to the second data storage location 207, followed by the third data storage location 209. The monitoring tool 100 automatically assigns an order based on the available data storage locations. Storage of further data is directed from one data storage location to another one when the available disk space of the earlier data storage location has been filled up. If there are more data storage locations beyond the 3 data storage locations 205, 207 and 209, and all the available disk space of the 3 data storage locations 205, 207, 209 have been filled up, the monitoring tool 100 continues to direct data storage to each of the other data storage locations in a sequential manner. However, if no valid data storage location could be found for further data storage, a data management policy is executed.

Execution of the data management policy is performed by the writing tool 110 when a notification is received from the monitoring tool 100. The data management policy involves overwriting or deleting data stored in earlier used data storage locations according to a data retention policy 140. The data retention policy 140 includes at least one of a data retention period 142 or a data erase period 144 allocated to each of the earlier used data storage locations. Basically, the data management policy overwrites or deletes expired or old data to make way for new data to be stored.

In scenario B, there is a computer server 204 with two storage media 206 and 208. The storage medium 206 has three partitions corresponding to three registered data storage locations 210, 212 and 214. Similarly, the storage medium 206 has three partitions corresponding to three registered data storage locations 211, 213 and 215. In total, there are six data storage locations 210, 212, 214, 211, 213 and 215. Each partition represents one registered data storage location. Each of the data storage locations 210, 212, 214, 211, 213 and 215 may have different data storage size.

In this case, the monitoring tool 100 manages data storage to the 6 data storage locations in the following order 210, 212, 214, 211, 213 and 215. The monitoring tool 100 automatically assigns an order based on the available data storage locations. Data is stored in another data storage location when the available disk space of the earlier data storage location has been filled up. If there are more data storage locations beyond the six data storage locations 210, 212, 214, 211, 213 and 215, and all the available disk space of the six data storage locations 210, 212, 214, 211, 213 and 215 have been filled up, the monitoring tool 100 continues to manage data storage in each of the other data storage locations in a sequential manner. However, if no valid data storage location could be found for further data storage, a data management policy is executed.

Execution of the data management policy is performed by the writing tool 110 when a notification is received from the monitoring tool 100. The data management policy involves overwriting or deleting data stored in earlier used data storage locations according to a data retention policy 140. The data retention policy 140 includes at least one of a data retention period 142 or a data erase period 144 allocated to each of the earlier used data storage locations. Basically, the data management policy overwrites or deletes expired or old data to make way for new data to be stored.

Table 2 illustrates data parameters stored in the storage parameter configuration Database 105 in FIG. 2A. Table 2 also shows a sample configuration for the three data storage locations 205 (C:/LOC1), 207 (D:/LOC2) and 209 (E:/LOC3) respectively. Each data storage location is configured with a data utilization limit. The data utilization limit 130 is used by the monitoring tool 100 in FIG. 1A to determine the maximum percentage of disk space allowed to be used in the respective data storage location until the monitoring tool 100 manages data storage by updating another data storage location to store data.

TABLE 2

| Storage Location Name | Data utilization limit | Storage Location Status |
| --- | --- | --- |
| C:\LOC1 | 50% | Primary |
| D:\LOC2 | 70% | Idle |
| E:\LOC3 | 90% | Idle |

The information in Table 2 can be read as follows. For example, data storage location C:/LOC1 has a data utilization of 50%, and it is assigned as a primary data storage location (e.g. 116 in FIG. 1B). This means that once the data space of data storage location C:/LOC1 is 50% consumed, data storage will shift to the next data storage location, which is D:\LOC2. The "primary" storage location status means that the data storage location C:/LOC1 has been assigned for current data storage. The idle statuses of the other two data storage locations D:/LOC2 and E:/LOC3 mean that these data storage locations are not assigned for data storage.

Figure 4:
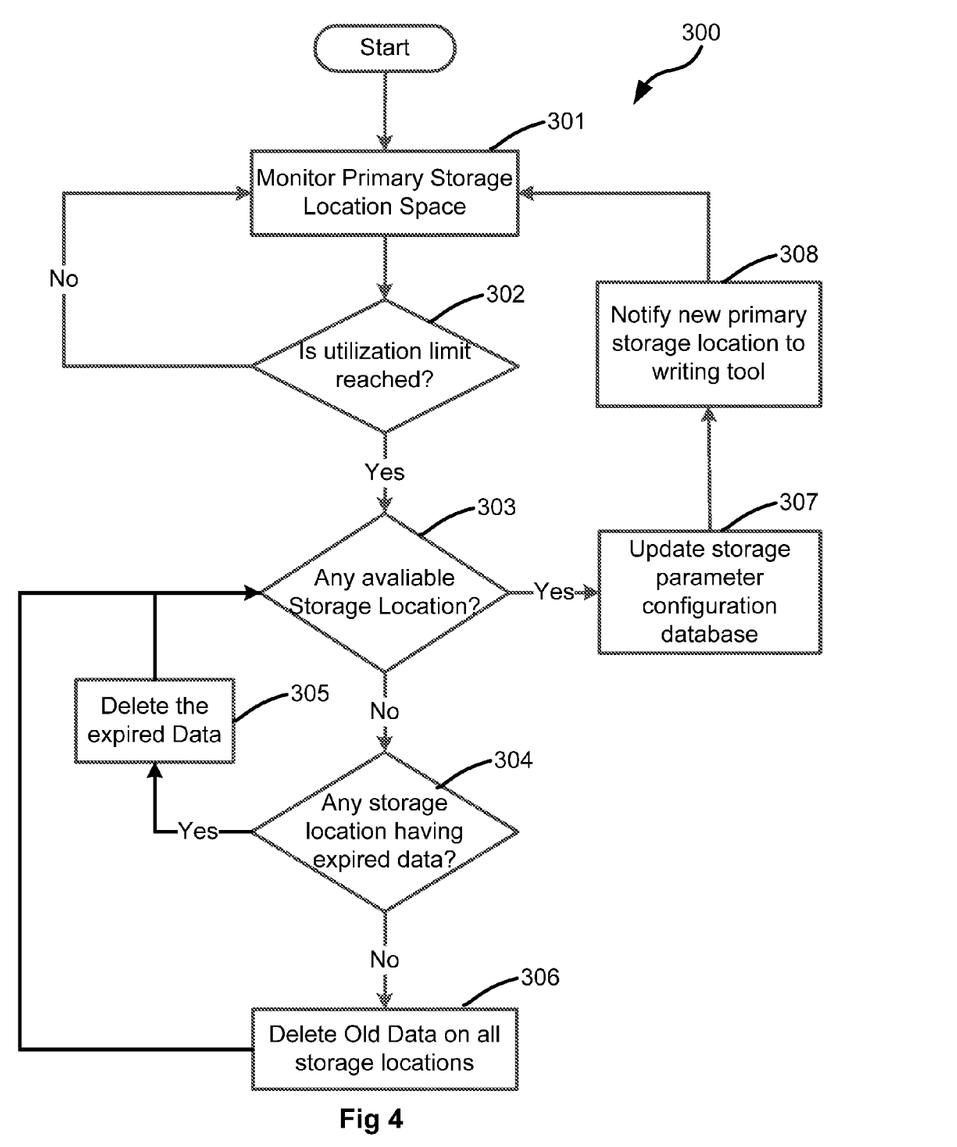
FIG. 4 is a data storage management workflow according to some embodiments of the present invention.

FIG. 4 is a data storage management workflow according to some embodiments of the present invention.

With reference to FIG. 1, FIG. 2A, FIG. 2B and FIG. 4 in the process flow, the monitoring tool 100 in FIG. 1 is configured to monitor a primary data storage location 116 that is used for data storage at step 301. The monitoring tool 100 retrieves the utilization parameter 140, the available disk space, of the primary data storage location. The utilization parameter 140 is compared against the data utilization limit 130 of the primary data storage location 116 at step 302.

If the data utilization limit 130 of the primary data storage location 116 is not exceeded, the monitoring tool 100 continues to monitor the primary data storage location 116 at step 301 and undergo the comparison at step 302. However, when the primary data storage location 116 data utilization limit 130 has been exceeded, the monitoring tool 100 then identifies if there are any available registered data storage locations to store data at step 303.

The criteria to identify whether a registered data storage location, if present, is available for data storage is based on minimum free data storage space corresponding to the specific registered data storage location. The minimum free data storage space is a data storage parameter in the storage parameter configuration database 105 indicating the available or minimum free data storage space in the specific data storage location for data storage. The minimum free data storage space parameter is configurable to modify its value or to set its value from a user interface 106.

If a registered data storage location is identified at step 303, the storage parameter configuration database 105 is updated by the storage location database access unit 104 to indicate that the identified registered data storage location is the new primary data storage location 116 at step 307. After step 307, the new primary data storage location 116 is published i.e. broadcasted to all tools that are configured to communicate with the monitoring tool 100 at step 308. This means that, if required, all the tools that are configured to communicate with the monitoring tool 100 are able to store data to the new primary data storage location 116 instead of the previous primary data storage location, which has exceeded the data utilization limit.

If no data storage location is identified or a data storage location with sufficient free data storage space is not identified at step 303, a data management policy, in this case, a data retention policy 140 with a first period is invoked to prevent an occurrence of a disk full scenario. The first period is a data retention period 142.

In step 304, the monitoring tool 100 sends a notification to the writing tool 110 to delete expired data in the primary data storage location 116 or all data storage locations 116a, 116b, 116c. The writing tool 110 determines whether there is any data storage location identified with the data retention period 142 that has lapsed, or in other words, containing data that has expired. For any identified data storage location with expired data, all the expired data is deleted at step 305, and step 303 will commence again.

This deletion will free up data storage space of the data storage locations 116a, 116b, 116c previously containing the expired data. For example, assuming that the current date is May 17, 2013, if there is data created on Jan. 1 2013 and the data retention period 142 of this data is indicated as 40 days, this data will be deleted. However if the data was created on May 1, 2013, and the data retention period 142 is 40 days, this data will not be deleted.

In some embodiments, there is no data storage location with expired data identified at step 304, or there is no data storage location with sufficient free data storage space after deleting expired data at step 305. Then data retention policy 140 is invoked for a second period, a data erase period 144, to prevent an occurrence of a disk full scenario. The data storage location with exceeded data utilization limit can be included as a data storage location that can be found at step 303.

In step 306, the monitoring tool 100 sends a notification to the writing tool 110 to delete old data in the primary data storage location 116 or all data storage locations 116a, 116b, 116c. The writing tool 110 identifies whether there is any data storage location containing data being stored for a period exceeding a data erase period 144 allocated to the data of the data storage location, or in other words whether there is any data storage location containing old data. If there is any data storage location containing old data, all the old data is deleted at step 306, and step 303 will commence again. This deletion frees up data storage space of the data storage locations previously containing the old data. For example, assuming that a data storage location is allocated a data erase period 144 of 30 days, any data stored in the data storage location over a duration exceeding 30 days is deleted.

It is appreciated that, if desired, the data retention policy 140 can be invoked for the first period or the second period independently or together.

Data storage management is management of data storage location according to at least one data management policy. In the present invention, data storage management first determines whether a data storage location 116a, 116b, 116c has sufficient disk space. Then data storage is shifted from one data storage location to another data storage location based on disk size or utilization limit of a data storage location and at least one data management policies in situations where a data storage location runs out of data storage space. Alternatively, a second data management policy is invoked to execute a data retention policy. Preferably, the data retention period has a data retention period or a data erase period. The data retention period is a period for keeping data in a data storage location from being overwritten or deleted, and the data erase period is a period indicating storage duration of data to be subjected to overwriting or deletion.

Figure 5:
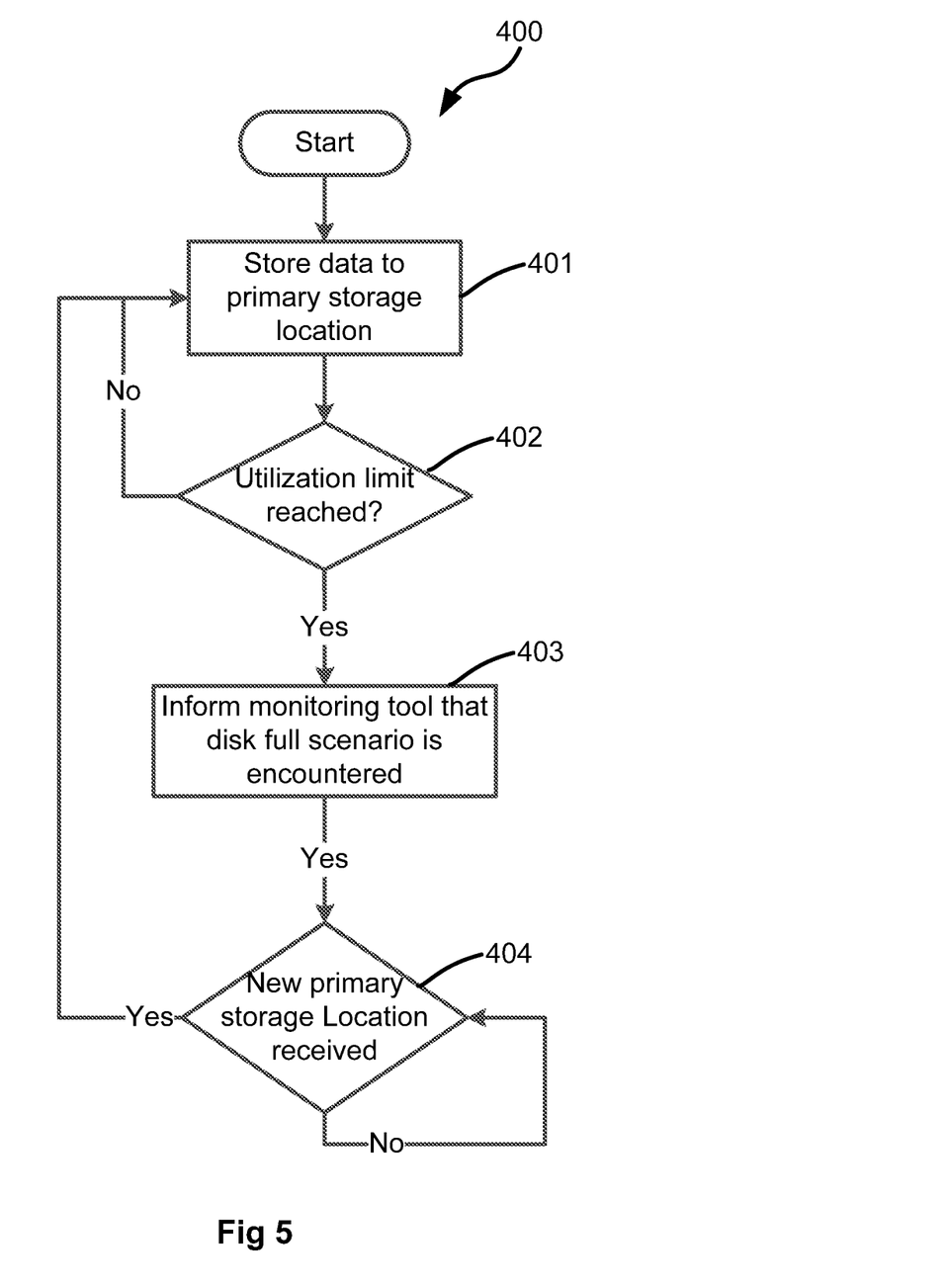
FIG. 5 is a data storage management workflow according to some embodiments of the present invention.

FIG. 5 is a data storage management workflow according to some embodiments of the invention.

At step 401, during operation, the writing tool 110 continuously stores data to a primary data storage location 116.

After a period of time, the primary data storage location 116 encounters a disk full scenario. When the disk full scenario happens, in step 402, the writing tool 110 determines if the utilization limit 130 has been reached. When the utilization limit 130 has not been reached, the writing tool 110 continues to store data in the primary data storage location. When the utilization limit 130 has been reached, the writing tool 110 sends a notification to the monitoring tool 100, in step 403, that a disk full scenario has been encountered. Thereafter, at step 404, the writing tool 110 checks whether a new primary data storage location update is received from the monitoring tool 100 before resuming writing of data to the new primary data storage location at step 401. If data of the new primary data storage location is not received at step 404, the writing tool 110 continues to checks until it is received.

It is appreciated that the new primary data storage location has to be checked whether it has sufficient free data storage space before data on it is sent to the writing tool 110. Furthermore, the data management policies previously described with reference to other drawings for overwriting or deleting data stored in accessible data storage locations according to a data retention period or a data erase period corresponding to the data of the accessible data storage locations still have to be implemented to free up data storage space in at least one of the accessible data storage locations so that one of them can be selected as the new primary data storage location.

Figure 6:
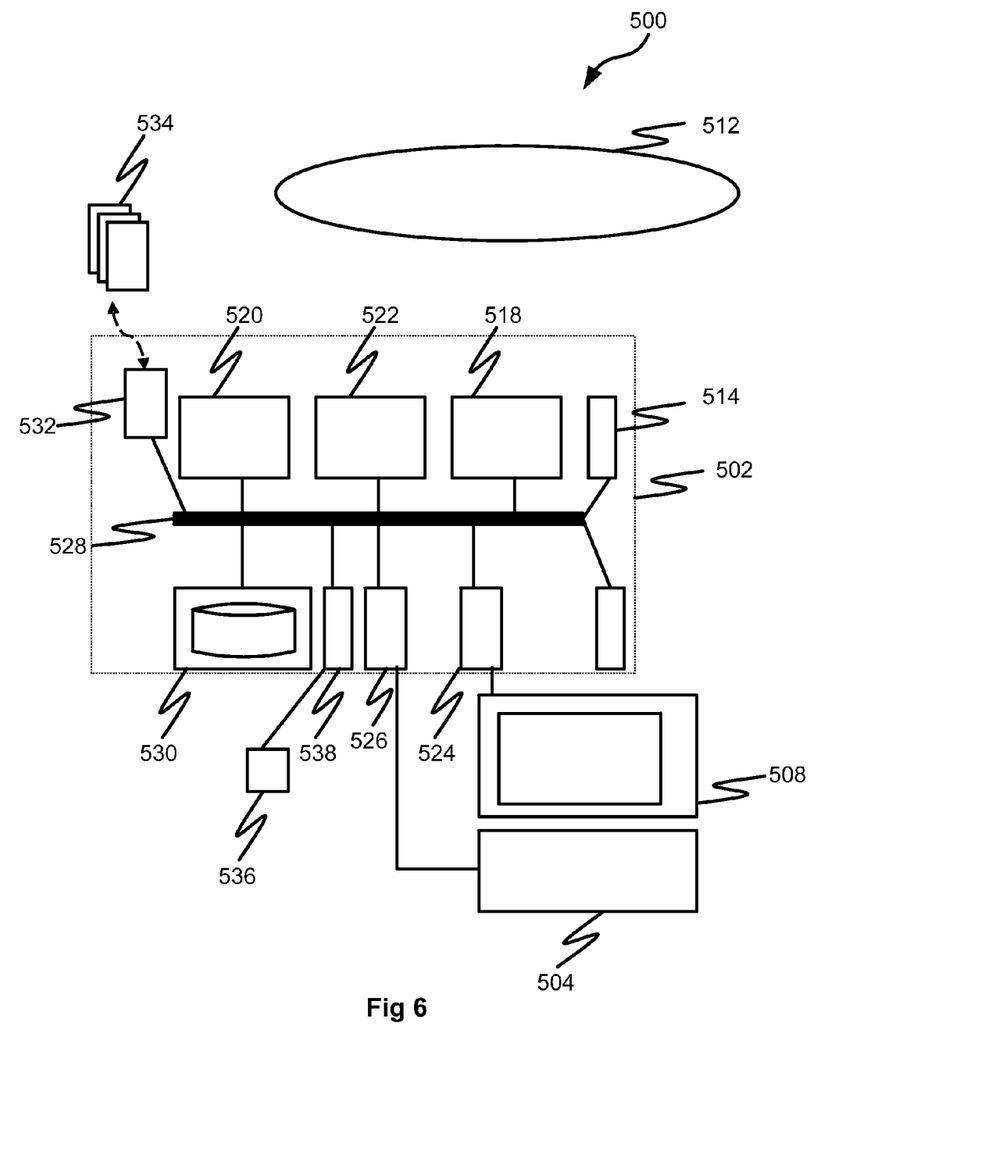
FIG. 6 is a block diagram illustrating a computer system or electronic apparatus according to an example of the present invention.

FIG. 6 shows in more detail an example of the computer system or electronic apparatus as described with reference to the monitoring tool 100 and writing tool 110. The computer system or electronic apparatus 500 may comprise a processing unit 502 for processing software including one or more computer programs for running or executing the monitoring tool 100, the writing tool 110, or any application connected to and/or communicating with the monitoring tool 100 or the writing tool 110, the processes for data storage shifting as described earlier and any application relating to the method and apparatus for managing data storage in the industrial plant as described herein.

Furthermore, the processing unit 502 may include user input modules such as a computer mouse 536, keyboard/keypad 504, and/or a plurality of output devices such as a display device 508. The display of the display device 508 may be a touch screen capable of receiving user input as well.

The processing unit 502 may be connected to a computer network 512 via a suitable transceiver device 514 (i.e. a network interface), to enable access to e.g. the Internet or other network systems such as a wired Local Area Network (LAN) or Wide Area Network (WAN). The processing unit 502 may also be connected to one or more external wireless communication enabled devices 534 via a suitable wireless transceiver device 532 e.g. a WiFi transceiver, Bluetooth module, Mobile telecommunication transceiver suitable for Global System for Mobile Communication (GSM), 3G, 3.5G, 4G telecommunication systems, or the like.

The processing unit 502 may include a processor 518, a Random Access Memory (RAM) 520 and a Read Only Memory (ROM) 522. The processing unit 502 may also include a number of Input/Output (I/O) interfaces, for example I/O interface 538 to the computer mouse 536, I/O interface 524 to the display device 508, and I/O interface 526 to the keyboard/keypad 504.

The components of the processing unit 502 typically communicate via an interconnected bus 528 and in a manner known to the person skilled in the relevant art.

The computer programs may further include one or more software applications for e.g. instant messaging platform, audio/video playback, internet accessibility, operating the system or apparatus 500 (i.e. operating system), network security, file accessibility, database management, which are applications typically equipped on a desktop, electronic apparatus or portable computer. The computer programs may be supplied to the user of the system or apparatus 500 encoded on a data storage medium such as a CD-ROM, on a flash memory carrier or a Hard Disk Drive, and are to be read using a corresponding data storage medium drive of a data storage device 530. Such application programs may also be downloaded from the computer network 512. The application programs are read and controlled in its execution by the processor 518. Intermediate storage of program data may be accomplished using RAM 520.

One or more of the computer programs may be stored on any non-transitory machine-or computer-readable medium. The machine- or computer-readable medium may include storage devices such as magnetic or optical disks, memory chips, or other storage devices suitable for interfacing with a general purpose computer. The machine-or computer-readable medium may also include a hard-wired medium such as that exemplified in the Internet system, or wireless medium such as that exemplified in the Wireless LAN (WLAN) system and the like. The computer program when loaded and executed on such a general-purpose computer effectively results in an apparatus that implements the steps of the computing methods in examples herein described.

Some advantages of the method and apparatus as described with reference to FIGS. 1A to 6 in comparison to some existing technologies are provided as follows.

With reference to U.S. Pat. No. 8,307,176, the system as disclosed does not allow data storage locations to be added during system runtime. Data utilization limits and minimum free data storage space are not configurable. There does not appear to be a data management policy for handling an event such as a disk full scenario. Also, duplicate time-stamped data entries, which have different data values, in one or more data storage locations are not allowed.

In contrast, the method and apparatus as described with reference to FIGS. 1 to 6 allow data storage locations to be added during runtime of the system or apparatus. Data utilization limits of each data storage location is configurable as well as the minimum free data storage space that is required in order to use the data storage location as a primary data storage location. There is also a retention policy to handle disk full scenarios by deleting user configured data groups that have data retention and data erase periods. Furthermore, the system or apparatus improves user customization by enabling configuration of which data can be deleted and when the data can be deleted. In addition, duplicate time-stamped data entries, which have different data values, in one or more data storage locations, are allowed.

With reference to U.S. Pat. No. 7,363,454, the system as disclosed does not allow data storage location parameters to be configured. Only an algorithm to select the best data storage location to use is provided but it does not provide means to handle a disk full scenario. Basically, this means that the system of U.S. Pat. No. 7,363,454 does not have a data management policy. Furthermore, data is not sequentially stored in the data storage locations and this may cause performance issues when the data is read.

In contrast, in the method and apparatus as described with reference to FIGS. 1A to 6, data storage location parameters are configurable and can be added during runtime of the system or apparatus. Also, data utilization limits as well as minimum free data storage space can be configured. The primary data storage location utilization parameter 136 is periodically monitored and the system or apparatus effectively selects the next data storage location before an event such as a disk full scenario occurs at the primary data storage location. This means that for most of the time, data is stored in sequential format. Furthermore, at least one data management policy is applied to enable the system or apparatus to effectively handle events such as disk full scenarios easily. This ensures higher data storage location availability.

With reference to the existing Disk Management System, Osisoft PI, the size allotted to each data storage location is fixed. Thus, flexibility in terms of file or disk sizes is limited. Also, each data storage location must have the same size, and data storage locations cannot be added during runtime of the system. Data management policy is not user customizable. This means that a user cannot configure any data management policy as the system merely overwrites the oldest data archive entirely without any considerations.

In contrast, in the method and apparatus as described with reference to FIGS. 1A to 6, the size allotted to each data storage location is configurable, thus allowing more flexibility. Moreover, each data storage location does not need to be of the same size. Data management policy is configurable and provides flexibility in terms of selecting which data should be retained and when the data should be retained. Also, the oldest data archive is overwritten or deleted after considerations.

In addition, in the method and apparatus as described with reference to FIGS. 1A to 6, a user can add or remove data storage devices providing the data storage locations on the fly (i.e. plug and play). When a new data storage location is added and configuration is changed to include the new data storage location such as new disk drive, flash drive, and the like, the method and apparatus as described with reference to FIGS. 1A to 6 can perform the actions relating to disk full scenario, data retention and data erase to ensure smooth data storage location addition. Similarly, when a data storage location is removed and the appropriate configuration is done, method and apparatus as described with reference to FIGS. 1 to 6 can ensure smooth data storage continues without any data loss. Moreover, advantages of the method and apparatus as described with reference to FIGS. 1 to 6 may be contributed by implementing the two data management steps together, that is, change of data storage location when a first data storage location has exceeded its data utilization limit, and changing, overwriting or deleting data based on one or more data management policies.

Many modifications and other examples can be made to the data storage management method and apparatus, and non-transitory computer readable medium in an industrial plant described herein by those skilled in the art having the understanding of the above described disclosure together with the drawings. Therefore, it is to be understood that the data storage management method and apparatus, and non-transitory computer readable medium in an industrial plant is not to be limited to the above description contained herein only, and that possible modifications are to be included in the claims of the disclosure.

What is claimed is:

1. A data storage management apparatus in an industrial plant, comprising:
   a plurality of data storage locations, with a first data storage location in the plurality of data storage locations being configured to be a primary data storage location for storing data, each of the plurality of data storage locations having a utilization limit; and a processor including:
      a monitoring tool configured to communicate with the plurality of data storage locations and a storage parameter configuration database; and
      a writing tool configured to communicate with the plurality of data storage locations, the monitoring tool, and a storage data configuration database, the writing tool storing data to the primary data storage location,
   wherein the monitoring tool is configured to:
      retrieve, from the storage parameter configuration database, the utilization limit for the primary data storage location;
      determine, from the primary data storage location, if a utilization parameter of the primary data storage location is the same as or greater than the retrieved utilization limit for the primary data storage location; and
      when the primary data storage location utilization parameter is determined to be the same as or greater than the retrieved utilization limit,
         configure a second data storage location in the plurality of data storage locations to be the primary data storage location when the second data storage location has a utilization parameter that is less than the utilization limit for the second data storage location, and
         send a notification to the writing tool when none of the plurality of data storage locations respectively have a utilization parameter that is less than the utilization limit for each respective one of the plurality of data storage locations;
   wherein when the writing tool receives the notification from the monitoring tool, the writing tool is configured to:
      retrieve, from the storage data configuration database, a data retention policy;
      identify, from the plurality of data storage locations, stored data having a storage duration the same as or greater than the retrieved data retention policy; and
      delete the identified stored data from the plurality of data storage locations.

2. The apparatus in claim 1, wherein the stored data comprises a plurality data types, the apparatus further comprises a plurality of writing tools, one writing tool for each data type.

3. The apparatus in claim 2, wherein the monitoring tool sends the notification to each of the plurality of writing tools at the same time.

4. The apparatus in claim 1, wherein the utilization limit is different between at least two of the plurality of data storage locations.

5. The apparatus in claim 1, wherein the monitoring unit comprises a configuration unit configured to communicate with a user interface, the configuration unit receives an input of the utilization limit for at least one of the plurality of data storage locations to be supplied on the user interface.

6. The apparatus in claim 5, wherein the configuration unit is configured to communicate with the user interface to receive an input of at least one of:
 a new data storage location to be added to the plurality of data storage locations,
 one of the plurality of data storage locations to be removed from the plurality of data storage locations, and
 the utilization limit for at least two of the plurality of data storage locations.

7. A data storage management method comprising:
 storing data in a primary data storage location, the primary data storage location being a first data storage location in a plurality of data storage locations, each of the plurality of data storage locations having a utilization limit;
 retrieving, from a storage parameter configuration database, the utilization limit for the primary data storage location;
 determining, from the primary data storage location, if a utilization parameter is the same as or greater than the retrieved utilization limit for the primary data storage location;
 when the primary data storage location utilization parameter is determined to be the same as or greater than the retrieved utilization limit for the primary data storage location, configuring a second data storage location in the plurality of data storage locations to be the primary data storage location when the second data storage location has a utilization parameter that is less than the utilization limit for the second data storage location; and
 when none of the plurality of data storage locations respectively have a utilization parameter that is less than the utilization limit for each respective one of the plurality of data storage locations, retrieving a data retention policy from the storage data configuration database, identifying, and deleting stored data in the plurality of data storage locations having a storage duration the same as or greater than the retrieved data retention policy.

8. The method in claim 7, wherein the data retention policy comprises at least one of a first period and a second period, the second period is different from the first period, the method further comprises:
 receiving an input of one of: the utilization limit for at least one of the plurality of data storage locations, the first period in the data retention policy, and the second period in the data retention policy, to be supplied on a user interface; and
 storing the received at least one of: the first period in the data retention policy and the second period in the data retention policy to the storage data configuration database.

9. The method in claim 7, wherein the data retention policy comprises at least one of a first period and a second period, the second period is different from the first period, the method further comprises:
 determining, from the primary data storage location, a storage duration;
 retrieving, from the data retention policy in the storage data configuration database, the first period;
 determining if the storage duration is the same as or greater than the retrieved first period,
 when the storage duration is less than the retrieved first period,
  retrieving, from the data retention policy in the storage data configuration database, the second period; and
  determining if the storage duration is the same as or greater than the retrieved second period.

10. The method in claim 7, further comprising receiving an input from a user interface of one of: a new data storage location to be added to the plurality of data storage locations, and one of the plurality of data storage locations to be removed from the plurality of data storage locations.

11. A non-transitory computer readable medium that stores a computer program to be executed by a data storage management apparatus to perform a data storage management method in an industrial plant, the method comprising:
 storing data in a primary data storage location, the primary data storage location being a first data storage location in a plurality of data storage locations, each of the plurality of data storage locations having a utilization limit;
 retrieving, from a storage parameter configuration database, the utilization limit for the primary data storage location;
 determining, from the primary data storage location, if a utilization parameter is the same as or greater than the retrieved utilization limit for the primary data storage location;
 when the primary data storage location utilization parameter is determined to be the same as or greater than the retrieved utilization limit for the primary data storage location, configuring a second data storage location in the plurality of data storage locations to be the primary data storage location when the second data storage location has a utilization parameter that is less than the utilization limit for the second data storage location; and
 when none of the plurality of data storage locations respectively have a utilization parameter that is less than the utilization limit for each respective one of the plurality of data storage locations, retrieving a data retention policy from the storage data configuration database, identifying, and deleting stored data in the plurality of data storage locations having a storage duration the same as or greater than the retrieved data retention policy.

* * * * *